METHOD OF PACKAGING POROUS COFFEE BREWING PACKETS CONTAINING FRESH GROUND COFFEE

Earle F. Hiscock, Chatham, Mass., assignor to Kip, Inc., Chatham, Mass., a corporation of Delaware
No Drawing. Filed Mar. 25, 1964, Ser. No. 354,784
6 Claims. (Cl. 99—152)

This invention relates to an improved method of packaging porous coffee containing packets for the brewing of coffee so as to remove substantially all of the air present in the packet and all of the air surrounding the packet thereby ensuring that the coffee will stay fresh for many months.

Before roasting and grinding, green coffee beans can be stored for months and even years under ordinary atmospheric conditions without damage to the quality of the green coffee. After roasting, and especially after subsequent grinding, coffee becomes a highly perishable product and must be promptly packaged in a container substantially free of oxygen if its freshness is to be maintained. Indeed freshly ground coffee will become stale and rancid in less than a few weeks time unless it is packaged in a sealed container with substantially all of the oxygen removed. This latter requirement is very important since there is a large amount of free air space between the individual particles of comminuted coffee. The oxygen present in this free air space is sufficient to cause rapid staling and subsequent rancidity of the coffee, even though the coffee is packed in a tightly closed container. Thus, in packaging coffee in tin cans to form the well known vacuum packed tin can in the standard method of packaging loose ground coffee to ensure its freshness for an extended period, the fresh ground comminuted coffee is placed in a can, the can is placed in a sealed chamber, a vacuum of about 28 inches is drawn in the chamber and the cover is tightly sealed onto the can while the can is subjected to this high degree of vacuum.

I have previously invented, and have separately disclosed, a sealed, porous packet adapted to contain freshly ground coffee and to be used in the brewing of coffee. This packet is made of pure taste free materials which will not cause catalytic degradation of the delicate aroma and flavor characteristics of the fresh ground coffee even when the coffee is stored for long periods in the packet and thus in intimate contact with the porous synthetic fiber paper from which the packet is made.

I have used the conventional tin can and the conventional vacuum sealing process for packaging a plurality of my coffee brewing packets under high vacuum with excellent results thus ensuring the freshness of the ground coffee contained in the porous packages many months. I have noted, however, that when the sealed can containing the plurality of the individual coffee brewing packages is opened, the coffee contained in the packets loses much of its freshness in a very few days. Presumably this is because air (and its included oxygen) can pass between the packages very easily thus coming into close and intimate contact with the coffee particles contained within the porous bags. In general the effect is even more pronounced than with a can containing loose ground coffee. For this reason, while the packets of ground coffee will remain fresh for extended periods as long as the vacuum sealed can remains sealed once the can is opened all of the packets contained therein should be used in a very short period of time.

One way to overcome this problem of course is to limit the contents of the vacuum sealed cans to that number of packets which could be used in a very short time. However, if too few packets are placed in a single can the cost of the can becomes prohibitive.

Another possible solution would be to vacuum package packets either individually or in small units in an impermeable flexible package or overwrap. This is not without its difficulties. On the one hand, the use of vacuum chambers maintained under a high degree of vacuum during the overwrapping and sealing operation is difficult and hence expensive. On the other hand, any attempt to draw the vacuum on the inside of the package while the outside thereof is subjected to atmospheric pressure is normally self-defeating and ineffective since the package tends to neck down and block off the evacuating means well before the entire contents of the package have been evacuated.

In any event, however, the vacuum packaging of a comminuted material, such as coffee, in a flexible package is hardly satisfactory at best. The reason for this is that the voids that remain between the individual particles create a pressure differential between the outside and the inside of the package which differential is quickly eliminated by passage of air into the inside of the package from the atmosphere if the overwrap is the slightest bit permeable or if there are any pinholes or other imperfections.

Rather than to attempt to remove the oxygen I propose to replace the oxygen with an inert gas such as carbon dioxide or nitrogen or the like. Further I propose to introduce this inert gas in such manner that it fills all of the interstices between and surrounding the individual particles as well as all of the free spaces in the overwrapped package in such manner that there is substantially no differential pressure between the inside and the outside of the overwrapped package, and hence no great tendency for any transfer of gas through the overwrapping.

I have discovered a method of packaging fresh ground coffee in porous coffee containing packets for the brewing of coffee, and for packaging such packets in individual flexible packages whereby substantially all of the air present in the packet, and all of the air surrounding the packet, is removed before the package is sealed thereby ensuring that the coffee will stay fresh for many months. In the practice of my method, substantially all of the oxygen associated with the ground coffee is supplanted by an inert gas with the result that the residual oxygen is reduced to an absolute minimum which may be as little as two percent or less of the amount normally present.

Briefly my method consists of the steps of flowing inert gas through the particles of comminuted coffee and through the interstices of the porous brewing packet, overwrapping the packet with a gas impermeable film while flushing out the air which surrounds the brewing packet by means of a second stream of inert gas; and finally sealing the gas resistant film overwrapping the sealed packet to form a gas tight package substantially free of oxygen.

One convenient way of flowing inert gas through the particles of comminuted coffee and out through the interstices of the porous brewing packet is to flow an inert gas through the particles of ground coffee as the particles are being introduced into the porous coffee brewing packet and additionally out through the interstices of the brewing packet and then sealing the packet.

Another way of flowing inert gas through the particles of comminuted coffee and through the interstices of the porous brewing packet is to fill the packet with the ground coffee and seal the packet. The coffee containing packet is then flushed by flowing an inert gas through the interstices of the porous brewing packet and on through the particles of comminuted coffee.

In practicing my invention by the first way that I mentioned, I employ any of the existing commercial vertical pouch forming and filling machines and equip it with a means of introducing an inert gas into the ground coffee in the region of the hopper. The flow of the inert gas is in two directions upward through the coffee particles in the hopper and downward through the filling tube. As the particles of comminuted coffee fall from the filling tube into the porous brewing packet which is being formed on this machine, the flow of inert gas is through the particles of coffee and out through the interstices of the porous brewing packet, thus flushing the air from both the coffee and the packet. On this machine as soon as the packet is filled it is sealed.

In practicing my invention in the second way, I employ the same type of existing commercial vertical pouch forming and filling machines without the addition of a means of introducing an inert gas. I then flush the filled and sealed porous coffee brewing packet by flowing an inert gas through the interstices of the porous brewing packet and on through the particles of comminuted coffee. This can be accomplished by any of several simple methods, such as placing the packets in a chamber, evacuating the chamber and then breaking the vacuum with an inert gas or placing the coffee containing porous packet in a stream of inert gas.

I complete my improved method of packaging porous coffee containing packets by overwrapping the packets which have been formed, filled, sealed and flushed with a gas resistant film while flushing out the air which surrounds the packet with an inert gas, and finally sealing the gas resistant film to form a gas tight package containing the coffee packet, which package is substantially free of oxygen.

This overwrapping, while flushing with an inert gas, can be accomplished by any of several standard commercial overwrapping machines.

I claim:

1. The method of packaging fresh ground coffee in porous coffee brewing packets which comprises forming a packet of porous material; introducing ground coffee into said packet; flowing an inert gas through the particles of ground coffee as such particles are being introduced into said packet in sufficient volume that said inert gas flows out through the interstices of the brewing packet; sealing the packet; overwrapping said packet with a gas resistant film; flushing out the air surrounding said packet in said film with an inert gas; and sealing said gas resistant film while said packet is in the presence of said inert gas to form a gas tight package containing said coffee packet, said package being substantially at atmospheric pressure and being substantially free of oxygen.

2. The method of claim 1 wherein the said overwrapping of said packet is accomplished within ten minutes of the sealing of the packet.

3. The method of claim 1 wherein the sealed packet is held in a chamber filled with an atmosphere of inert gas until the packet is fed to the overwrapping machine.

4. The method of packaging fresh ground coffee in porous coffee brewing packets which comprises forming a packet of porous material; introducing ground coffee into said packet; sealing the packet; flowing an inert gas through the interstices of said brewing packet in sufficient volume to flush the coffee contained therein; overwrapping said packet with a gas resistant film; flushing out the air surrounding said packet in said film with an inert gas; and sealing said gas resistant film while said packet is in the presence of said inert gas to form a gas tight package containing said coffee packet, said package being substantially at atmospheric pressure and being substantially free of oxygen.

5. The method of claim 4 wherein the said overwrapping of said packet is accomplished within ten minutes of the flushing of the packet.

6. The method of claim 4 wherein the flushed packet is held in a chamber filled with an atmosphere of inert gas until the packet is fed to the overwrapping machine.

References Cited

UNITED STATES PATENTS

| 2,022,467 | 11/1935 | Heyman | 99—77.1 |
| 2,046,158 | 6/1936 | Gore et al. | 99—152 |
| 2,131,181 | 9/1938 | Kantor | 99—189 X |
| 2,194,451 | 3/1940 | Soubier | 99—152 X |
| 2,225,810 | 12/1940 | Waters | 99—152 |
| 2,309,621 | 2/1943 | Allatt | 99—77.1 X |
| 2,569,217 | 9/1951 | Bagdigian | 99—152 X |

A. LOUIS MONACELL, *Primary Examiner.*

RAYMOND N. JONES, *Examiner.*